US012104410B2

(12) United States Patent
Weber

(10) Patent No.: US 12,104,410 B2
(45) Date of Patent: Oct. 1, 2024

(54) T-SHAPED LEVER GATE LATCH PULL SYSTEM

(71) Applicant: Karen H. Weber, Woodinville, WA (US)

(72) Inventor: Karen H. Weber, Woodinville, WA (US)

( * ) Notice: Subject to any disclaimer, the term of this patent is extended or adjusted under 35 U.S.C. 154(b) by 505 days.

(21) Appl. No.: 17/535,533

(22) Filed: Nov. 24, 2021

(65) Prior Publication Data

US 2022/0081939 A1 Mar. 17, 2022

Related U.S. Application Data

(63) Continuation-in-part of application No. 16/427,532, filed on May 31, 2019, now abandoned.

(51) Int. Cl.

| | |
|---|---|
| ***E05B 65/00*** | (2006.01) |
| ***E05B 15/00*** | (2006.01) |
| ***E05B 53/00*** | (2006.01) |
| ***E05B 63/00*** | (2006.01) |

(52) U.S. Cl.
CPC ...... *E05B 65/0007* (2013.01); *E05B 15/0093* (2013.01); *E05B 53/003* (2013.01); *E05B 63/0052* (2013.01)

(58) Field of Classification Search
CPC ............. E05B 65/0007; E05B 15/0093; E05B 53/003; E05B 63/0052
See application file for complete search history.

(56) References Cited

U.S. PATENT DOCUMENTS

| | | | | |
|---|---|---|---|---|
| 5,358,292 | A * | 10/1994 | Van Wiebe | E05C 3/30 292/225 |
| 5,465,595 | A * | 11/1995 | Sheppard | E05B 13/002 292/264 |
| 6,170,892 | B1 * | 1/2001 | Lantiegne | E05B 65/0007 292/237 |
| 8,764,076 | B2 * | 7/2014 | Glover | E05C 3/30 292/225 |
| 8,820,802 | B1 * | 9/2014 | Dodson | E05B 65/0007 292/1 |
| 9,803,396 | B2 * | 10/2017 | Timothy | E05B 65/0007 |
| 10,358,849 | B2 * | 7/2019 | Glover | E05B 17/10 |
| 10,385,597 | B2 * | 8/2019 | Siebert | E05C 19/026 |
| 10,669,746 | B2 * | 6/2020 | Nguyen | E05B 57/00 |
| 2017/0342752 | A1 * | 11/2017 | Quam | E05C 19/184 |
| 2018/0238084 | A1 * | 8/2018 | Weber | E05B 53/003 |
| 2019/0112848 | A1 * | 4/2019 | Carter | E05C 3/40 |
| 2020/0378158 | A1 * | 12/2020 | Weber | E05B 53/00 |

* cited by examiner

*Primary Examiner* — Mark A Williams
(74) *Attorney, Agent, or Firm* — Patrick M Dwyer

(57) ABSTRACT

A gate latch pull system for a swinging gate and gate post. A gate latch with pivotal latch lever is mounted on a gate post and a latch bar on an inside edge of a swinging gate. A T shaped lever with first and second lever arms and a swinging base is pivotally mounted on the gate post above the gate latch. A vertical linkage connectable between bottom of swinging base and top of the pivotal latch lever, with the linkage adjustable in length during connection of the base and the latch lever such that when the latch lever is in a latched position and the swinging base is vertical, the linkage has flexibility, slack and weight enough to provide additional downward weight bias to pivotal motion of the latch lever.

12 Claims, 6 Drawing Sheets

Figure 1 [Prior Art]

T-SHAPED LEVER GATE LATCH PULL SYSTEM

CROSS REFERENCE TO RELATED APPLICATIONS

This application is a Continuation-in-Part of U.S. patent application Ser. No. 16/427,532 filed May 31, 2019, which is hereby incorporated by this reference as if fully set forth herein.

TECHNICAL FIELD

This disclosure relates to gate latch systems; more particularly it relates to a gate latch pull system with a pendulating or swinging T lever and a bias weighted linkage between lever and latch.

BACKGROUND

A number of gate latching and gate pull systems are known. A typical arrangement is a pivoting gate latch having a bent lever arm passing through a gate and operatively linked with a gate latch bar on a post beside the gate for opening the gate from the outside. Another gate latch release mechanism has a tubular guide through a gate post with a flexible line affixed to an inside mounted gate latch for opening the gate latch from outside.

Conventionally, a gate latch lever is pivotally mounted in a gate latch structure and includes a recess which partially surrounds and holds a gate-mounted latch bar in a gate-closed and latch-closed position as shown in FIG. 1. An outermost (uppermost) free end of the pivotal latch lever is provided with an aperture through which a string or cord can extend. A first end of the string or cord is received through a guide such as a staple loosely driven into the top end face of the gate post. The first end of the string is secured by a knot or loop to an enlarged ring. A second and opposite end of the string or cord is secured by a loop or knot fastener to a second enlarged ring.

Typically, pulling on one or both of the rings moves the pivotal latch lever up to an unlatch position. As this latch actuating mechanism provides no additional bias or downward pressure on the pivotal latch lever, the latch bar is subject to bouncing out of the latch when the gate is closed, and particularly when slammed. Thus upon release of the pull rings, there is only a small gravitation force acting on the pivotal latch lever itself to urge the latch lever to pivot down quickly and securely to the latched position. There is thus a substantial chance that, due to frictional force loss in the pivotal mounting of the latch lever or friction of the string and the staple or bore, or the opposing counterweight forced exerted by the rings, the pivotal latch lever will not move to a fully latched position, much less stay there.

In addition, conventional linkages to the pivotal latch lever comprise an additional lever (typically mounted atop a proximate gate post) that is visible to persons outside the gate and operable in only one direction, which is up and down.

What is needed is a simple lever latch pull system mountable on a gate post above the gate latch (or a fence or other gate-associated structure) which includes a weighted chain or line for additional downward bias on the pivotal latch lever. What is also needed is a latch pull lever that is mounted inside the gate/fence structure on an inside surface of a proximate gate post where it is not visible to passersby, and which advantageously may be operated from either side of the gate post by reaching slightly over the fence or the gate.

DISCLOSURE

This disclosure addresses and provides such a system that provides a simple lever latch pull system mountable on a gate post above the gate latch which includes a weighted chain or line for additional downward bias on the pivotal latch lever. The system is mounted inside the gate/fence structure on an inside surface of a proximate gate post where it is desirably not visible to passersby, and which advantageously may be operated from either side of the gate post by reaching over either side and slightly over the fence or the gate. The system is adapted to be used with an otherwise conventional form of gate latch bracket mounted on a stationary gate post adjacent a free edge of a gate. A conventional latch bar mounted on the gate includes an offset bend portion such that a portion of the end the latch bar may be disposed in alignment with, and for engagement in, a recess in the gate latch lever pivotally mounted in the latch bracket.

While vertical alignment of latch pull lever and latch is desirable, and gate post mounting of the latch advantageous, other positionings of the latch and off-vertical alignment of latch and pull lever will not depart from the scope of this disclosure. For instance, where there is a double gate, or otherwise no gate post proximate the gate opening, the latch assembly may be installed on the surface nearest the gate opening, and the latch pull on the same surface, or other nearby surface, to effect as much vertical alignment as the materials allow.

In one example, a lever gate latch pull system with a pivoting T-shaped lever having a swinging base is provided. First and second lever arms are integral to a swinging base to form a roughly "T" shape. Artisans will understand that the T lever may be stamped or forged or cast from a number of conventional and durable materials and or may be assembled from disparate pieces and pressed or welded together. The lever arms are desirably of equal length, but small variations in length or even unequal length will not depart from the scope of this disclosure. A pivot point (generally in the form of an aperture or hole in the T) is provided at the junction of the first and second lever arms, which is generally to say, at the midway point between the ends of the arms. The swinging base and lever arms form a T-shaped lever pivotally mounted via the pivot point to a gate post such that the swinging base pivots in an arc side to side as the lever arms are depressed to pivot up and down. As the swinging base pivots, the distance (but for a connecting linkage) would increase between an attachment point at the bottom of the base and an attachment point at the top of a pivotal gate latch lever. However in the example, the end of the swinging base is connected to the top of the pivotal latch lever by a weighted chain or line or the like, so that motion of the T lever imparts a corresponding motion to the latch lever. In operation, when either lever arm is depressed, the swinging base pivots in an upward arc to pull up the chain to unlatch the gate latch to release the latch bar.

In a further example, a gate latch pull system for a swinging gate and gate post has a conventional gate latch mechanism mountable upon an inside of the gate post, with the gate latch having a conventional pivotal latch lever, and the latch lever having a typical recess sized to receive the end of a conventional and typical gate latch bar. The latch bar is conventionally mountable at an inside edge of the swinging gate and when mounted is horizontally alignable with the recess of the pivotal latch lever. The T shaped lever has first and second lever arms and a swinging base, with the T lever conventionally and pivotally mountable on a pivot point midway between ends of the lever arms to an inside of the gate post and aligned vertically above the gate latch mechanism.

Advantageously, the lever arms are positioned below and near the top of gate post, and the lever arms are of substantially identical length, with the swinging base depending from substantially below the pivot point.

A vertical linkage connects the bottom of the swinging base to the top of the pivotal latch lever, and the linkage is adjusted in length during assembly, installation and connection of the base and the latch lever such that when the latch lever is in a closed or latched position and the swinging base is vertical, the linkage has flexibility, slack and weight enough, at least in the slack portion of the linkage, to provide additional downward weight bias to a pivotal motion of the latch lever.

Also, and desirably, the slack in the length-adjusted linkage is insufficient to prevent the swinging base from taking up the slack upon actuation of the T lever to reach a maximum swing of the swinging base to thus effect a corresponding full opening of the latch lever to release the latch bar from the gate latch.

The linkage is advantageously a chain of flexible links that has flexibility, slack and weight enough such that the weight itself, when slack, provides additional downward bias to the pivotal motion of the latch lever. For purposes of this disclosure it is desirable that additional weight bias be thus provided so the latch lever quickly closes to a degree sufficient to secure the latch bar therein, either when and as the T lever is released, or when a closing latch bar is pressed against the latch lever to raise the latch lever up and thereby accommodate entry of the latch bar into the recess. This may also be referred to herein as an effective amount of downward bias.

Alternatively, or in combination with the chain of links above, the linkage is any durable, all-weather flexible line that integrates a supplemental weight near the line's connection to the latch lever top, such that when the latch lever is in a closed or latched position and the swinging base is vertical, the line has flexibility, slack and weight enough to provide additional downward bias to the pivotal motion of the latch lever.

DETAILED DESCRIPTION

Figure 7A:
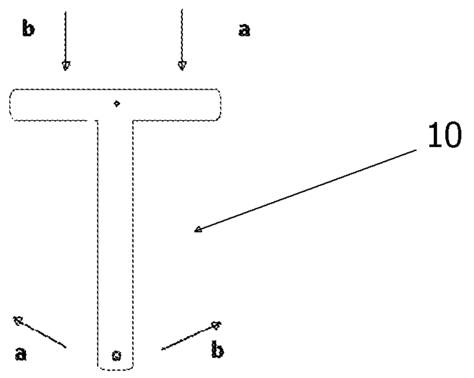
FIGS. 7A to 7C schematically illustrate aspects of the T-shaped lever.
Figure 7B:
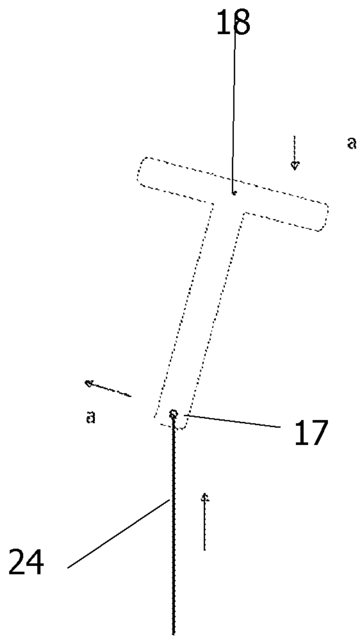
Figure 7C:
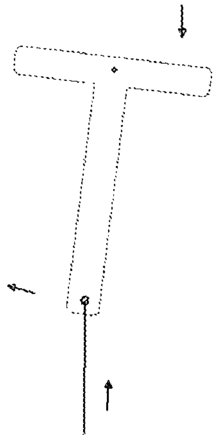

Unlike the 'seesaw' up-down motion of many conventional gate latch pulls (not unlike that of an old-style derrick crude oil pump), the disclosed T lever, side-mounted on the gate post, is a sideswing or pendulum-like motion where the latch pull vector can come from two different sets of directions (right and left of the gate post), one pull vector for each fraction of a degree of pendulum swing motion (see for example FIGS. 7A-7C). This motion is distinct from other teachings in that it varies from coming directly from overhead (with respect to the latch) to coming from any of several degrees to the side (as the T base swings to the side), both in origination of activation force on the linkage and in the vector transfer of that force, through the appropriate linkage, to the pivotal latch lever of the gate latch.

A conventional pivot latch lever (and recess) have only a limited and slight bias toward closure (down-pivot). This is conventionally accomplished by placing the pivot axis eccentrically below with respect to the center of mass of the latch lever. In practice, it is typically a barely adequate bias to overcome the friction of the pivot joint itself and the sliding engagement of the entrance of the latch bar itself into the recess.

Unexpectedly however a chain of links and or a flexible line having a weight attached proximate the point of line attachment to the pivot latch lever, adds considerable bias toward the latch closed position. This is especially advantageous for a chain of links because every link freed from the tension of the chain (for example, from when the latch lever is fully raised to then as it is lowered) adds incrementally to the biasing weight as the latch pull is released (after having been held open)—or as the latch bar raises (pushes up) the latch lever and then tucks itself into the recess—allowing the weight of slack chain (when the gate pull is not being held open) to bias the lever closed.

Turning now to the drawings, the disclosed latch pull system will be described by reference to the numerals of the drawing figures wherein like numbers indicate like parts.

Figure 1:
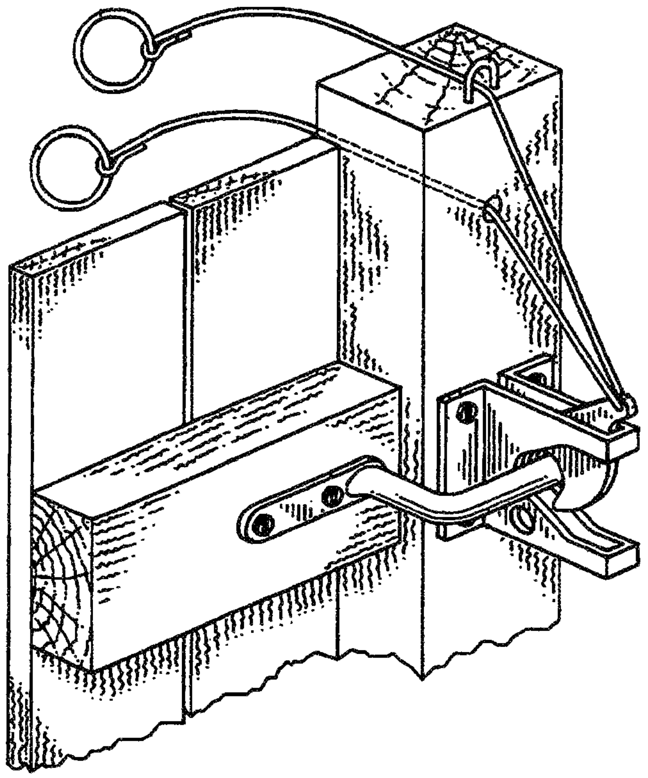
FIG. 1 illustrates a perspective view of a prior art conventional gate latch.
Figure 2:
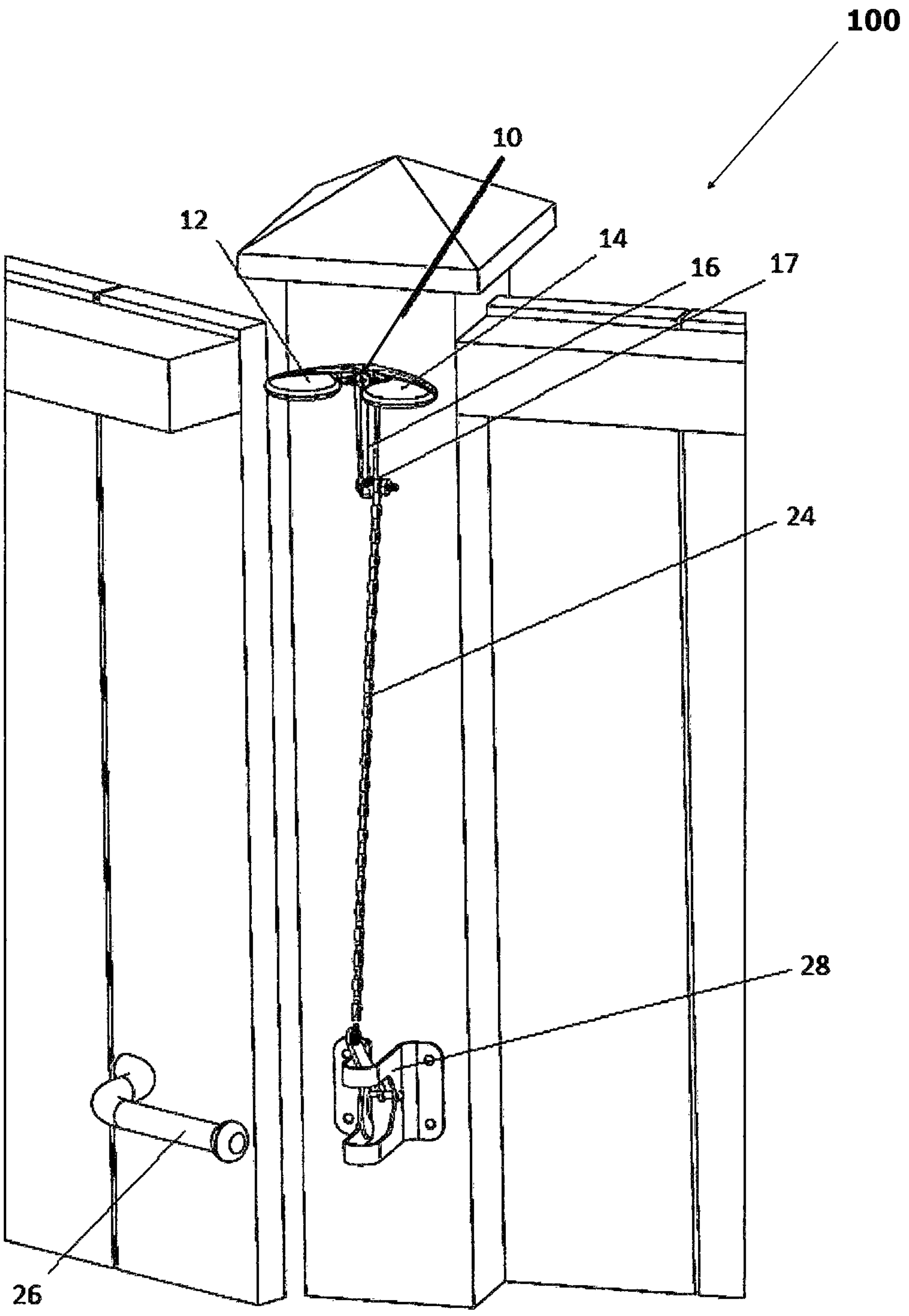
FIG. 2 illustrates a perspective view of the T-shaped lever gate latch pull system in latch closed position.
Figure 5:
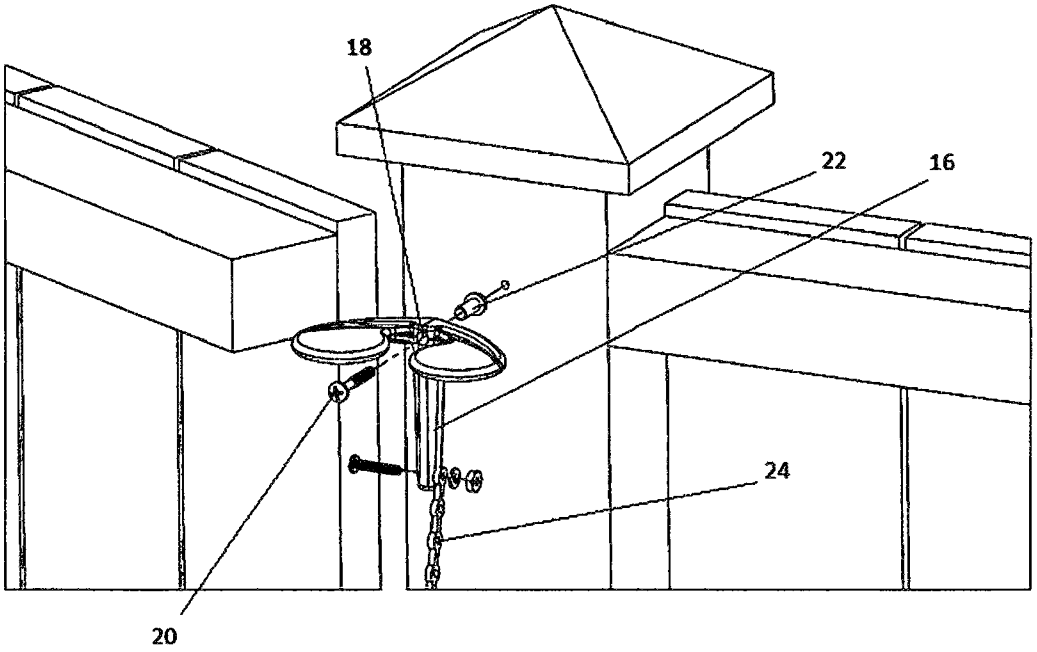
FIG. 5 illustrates an exploded view of the T-shaped lever of FIG. 4.

FIG. 2 illustrates a perspective view of the disclosed T-shaped lever gate latch pull system 100 in locked (closed, latched) position, but with latch bar 26 free. Pivoting T-shaped lever 10 has aligned first and second arms 12, 14 advantageously shaped as paddle handles. Swinging base 16 extends downward from the midpoint of first and second arms 12 and 14, forming the T-shape of lever 10. Pivot point (hole) 18 (shown in FIG. 5) is desirably positioned at a midpoint of first and second arms 12 and 14. When conventionally mounted on a gate post in the relative position shown (FIG. 5) such as with screw 20 and washer 22, arms 12 and 14 move in respective up and down arcs around pivot point 18, and swinging base 16 moves, along with attachment point 17, in respective side (and upward) arcs according to the respective motion of arms 12 and 14 to impart a lifting motion on weighted chain 24.

In one example, T-shaped lever arms 12 and 14 have a combined length of 3.5 inches, and swinging base 16 has a length of 1 inch to preserve the base swing from possible interference with the opening gate. T-shaped lever 10 is desirably positioned proximate a top of the gate post, facilitating actuation of the T lever from either side of the gate post without having to go around to unlatch the gate and without the T lever becoming visible from the outside.

Figure 6A:
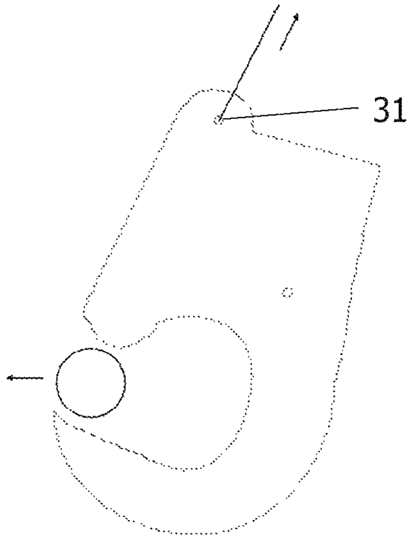
FIGS. 6A to 6C schematically illustrate aspects of the pivotal latch bar.
Figure 6B:
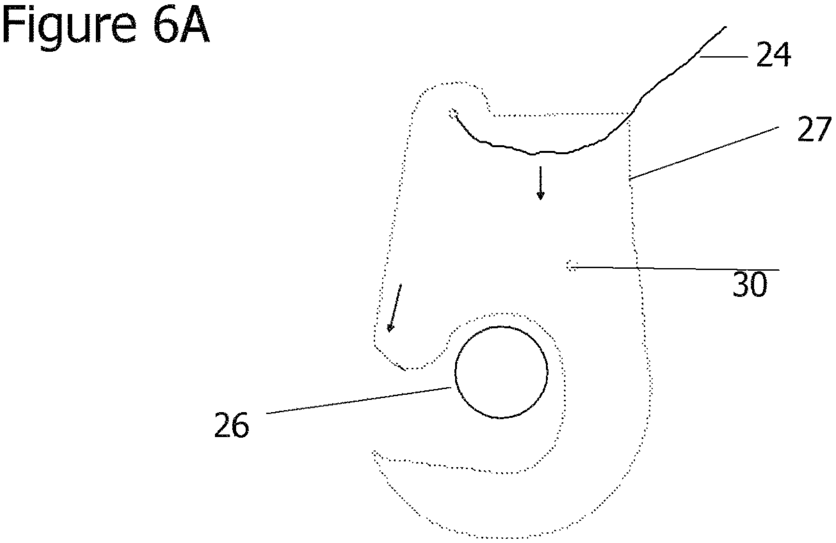
Figure 6C:
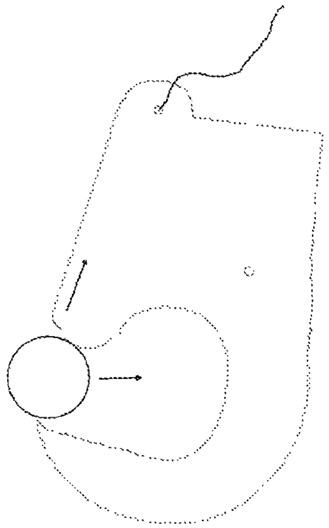

FIGS. 6A to 6C schematically illustrate aspects of engagement of latch bar 26 and pivotal latch lever 27, including exemplary rotational dynamics of latch lever 27 and tension and slack in line 24. Line 24 pulls upward on pivotal latch lever 27 to release latch bar 26 (FIG. 6A); slack in line 24 pulls pivot lever 27 back down to latch around latch bar 26 (FIG. 6B). Closing alternately, bar 26 pushes pivot lever 27 up and thus also creates slack in line 24 (FIG. 6C).

FIGS. 7A to 7C schematically illustrate rotational or pendulating aspects of T-shaped lever 10. FIG. 7A shows lever 10 in 'normal' (neutral) position, swinging base 16 hanging straight down; FIG. 7B shows lever 10 fully pendulated (or, in maximum swing) with pressing force at arrow "a" and maximum pulling force or upward motion on line 24; FIG. 7C shows one of many possible lever positions and pulling vectors for line 24—lever arm 14 partially depressed, swinging base 16 partially swung left, and line 24 only partially pulled up and in a vector direction different from those shown in FIGS. 7A and 7B.

Figure 3:
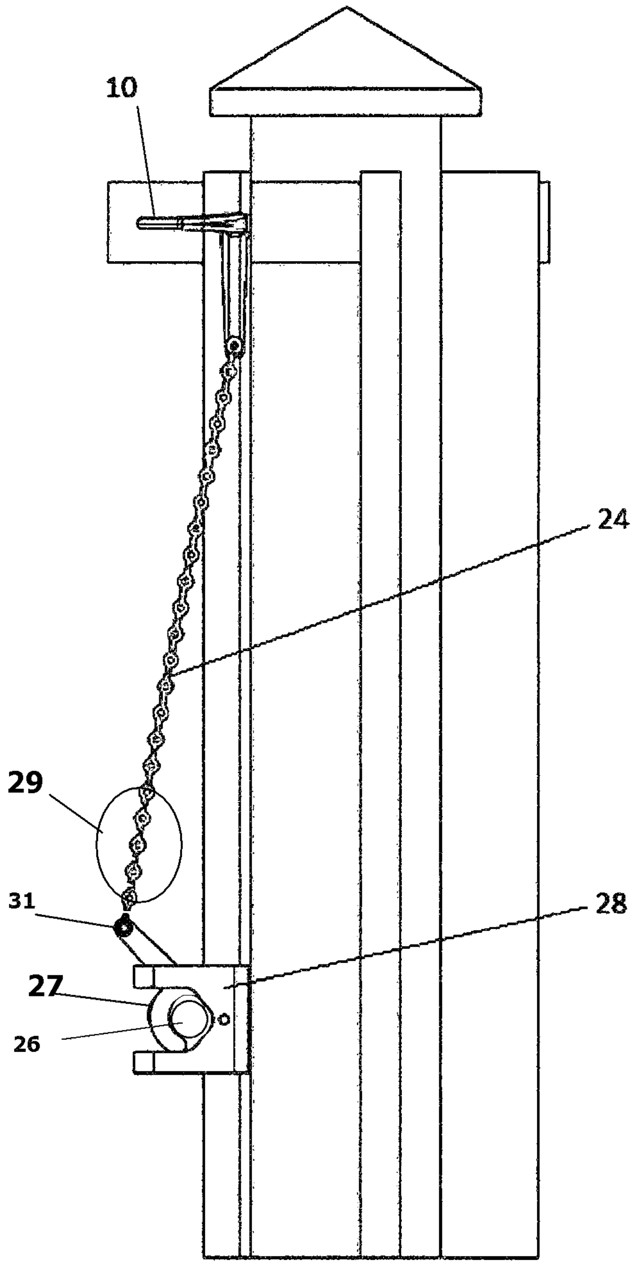
FIG. 3 illustrates a side view of the lever gate latch pull system of FIG. 2.
Figure 4:
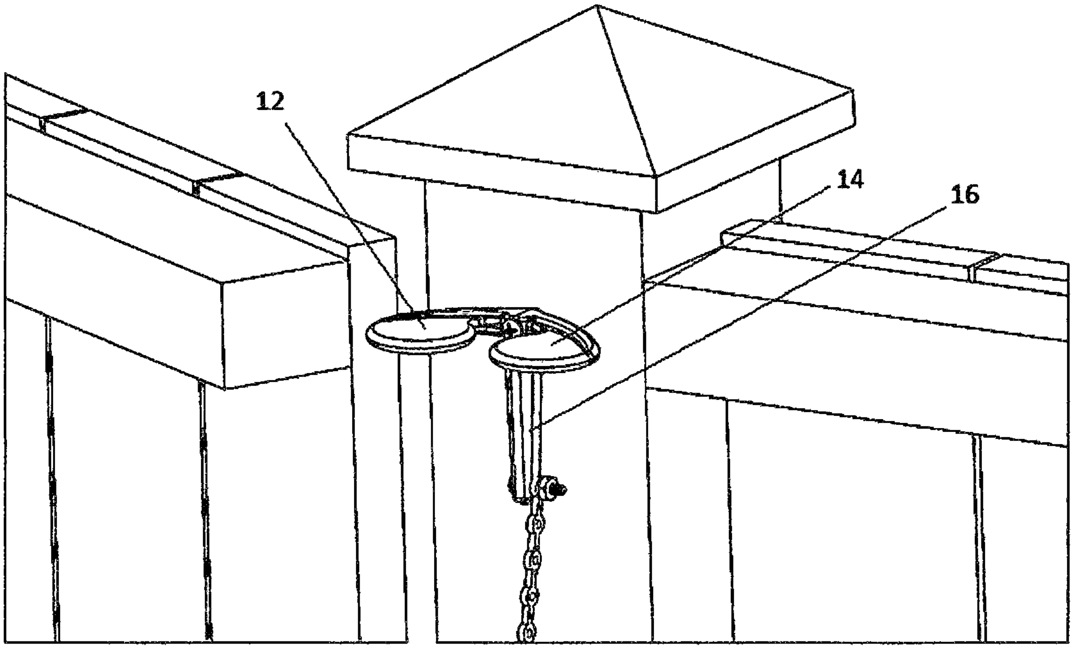
FIG. 4 illustrates a perspective view of the T-shaped lever of FIG. 2.

In FIG. 3, chain 24 connects T-lever 10 to pivotal latch lever 27 (conventionally mounted in gate latch structure 28 on pivot point 30) from point 17 to point 31, respectively. When either lever arm 12 or 14 is depressed, swinging base 16 is correspondingly swung sideways in an upward arc to tension chain 24 and pull up on it to pivot latch lever 27 upwards and thus unlatch gate latch 28 to release latch bar 26 so the gate can open.

It is to be noted that chain 24 is desirably installed so that with lever base 16 pointing more or less straight down and the gate closed, there is some slack in the chain. It may be further noted that, while chain 24 is shown, other weighted connecting links may be employed without departing from the scope of this disclosure. For example, a line or cable with weight 29 engaged on the line advantageously proximate an upper portion of pivotal latch lever 27 may be used.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A gate latch pull system for a swinging gate and gate post, the system comprising:

(a) a conventional gate latch mechanism mountable upon an inside of the gate post, the gate latch comprising a conventional pivotal latch lever, the latch lever having a recess;

(b) a conventional latch bar conventionally mountable at an inside edge of the swinging gate and conventionally horizontally alignable with the recess of the pivotal latch lever;

(c) a T shaped lever comprising first and second lever arms and a swinging base, the T lever conventionally pivotally mountable on a pivot point midway between ends of the lever arms, the T lever mountable upon an inside of the gate post and alignable vertically above the gate latch mechanism; and (d) a vertical linkage connectable between a bottom of the swinging base and a top of the pivotal latch lever, the linkage adjustable in length during connection of the base and the latch lever such that when the latch lever is in a latched position and the swinging base is vertical, the linkage has flexibility, slack and weight enough to provide additional downward weight bias to a pivotal motion of the latch lever.

2. The system of claim 1, further wherein the slack in the length-adjustable linkage is insufficient to prevent the swinging base from reaching a maximum swing to effect a corresponding full opening of the latch lever to release the keeper bar from the gate latch.

3. The system of claim 1, wherein the linkage comprises a chain of flexible links having a weight, when slack, such that the weight provides an effective amount of the downward bias to the pivotal motion of the latch lever.

4. The system of claim 1, wherein the linkage comprises a flexible line, the line comprising a supplemental weight proximate the line's connection to the latch lever top, such that the weight of line and supplemental weight, when slack, provides an effective amount of the downward bias to the pivotal motion of the latch lever.

5. The system of claim 1, wherein the lever arms are positionable below and proximate a top of gate post.

6. The system of claim 1, wherein the lever arms are substantially the same length and the swinging base depends from substantially below the pivot point.

7. The system of claim 2, wherein the linkage comprises a chain of flexible links having a weight, such that the weight, when slack, provides an effective amount of the downward bias to the pivotal motion of the latch lever.

8. The system of claim 2, wherein the linkage comprises a flexible line, the line comprising a supplemental weight proximate the line's connection to the latch lever top, such that the weight of line and supplemental weight, when slack, provides an effective amount of the downward bias to the pivotal motion of the latch lever.

9. A gate latch pull system for a swinging gate and gate post, the system comprising:

(a) a conventional gate latch mechanism mountable upon an inside of the gate post, the gate latch comprising a conventional pivotal latch lever, the latch lever having a recess;

(b) a conventional latch bar conventionally mountable at an inside edge of the swinging gate and conventionally horizontally alignable with the recess of the pivotal latch lever;

(c) a T shaped lever comprising first and second lever arms and a swinging base, the T lever conventionally pivotally mountable on a pivot point midway between ends of the lever arms, the T lever mountable upon an inside of the gate post and alignable vertically above the gate latch mechanism; and (d) a chain of flexible links having a weight, the chain connectable between a bottom of the swinging base and a top of the pivotal latch lever, the linkage adjustable in length during connection of the base and the latch lever such that when the latch lever is in a closed or latched position and the swinging base is vertical, the linkage has flexibility, slack and weight enough to provide an effective amount of downward bias to the pivotal motion of the latch lever.

10. The system of claim 9, wherein the lever arms are positionable below and proximate a top of gate post, the lever arms are substantially the same length and the swinging base depends from substantially below the pivot point.

11. A gate latch pull system for a swinging gate and gate post, the system comprising:

(a) a conventional gate latch mechanism mountable upon an inside of the gate post, the gate latch comprising a conventional pivotal latch lever, the latch lever having a recess;

(b) a conventional latch bar conventionally mountable at an inside edge of the swinging gate and conventionally horizontally alignable with the recess of the pivotal latch lever;

(c) a T shaped lever comprising first and second lever arms and a swinging base, the T lever conventionally pivotally mountable on a pivot point midway between ends of the lever arms, the T lever mountable upon an inside of the gate post and alignable vertically above the gate latch mechanism; and (d) a flexible line, the line connectable between a bottom of the swinging base and a top of the pivotal latch lever, the line comprising a supplemental weight proximate the line's connection to the latch lever top, such that when the latch lever is in a closed or latched position and the swinging base is vertical, the line has flexibility, slack and weight enough to provide an effective amount of downward bias to the pivotal motion of the latch lever.

12. The system of claim 11, wherein the lever arms are positionable below and proximate a top of gate post, the lever arms are substantially the same length and the swinging base depends from substantially below the pivot point.

* * * * *